3,297,756
CYCLONONATETRAENIDE SALTS AND
PROCESS OF PREPARING
Richard E. Benson, Wilmington, and Eugene A. La
Lancette, Hockessin, Del., assignors to E. I. du Pont
de Nemours and Company, Wilmington, Del., a corporation of Delaware
No Drawing. Filed July 19, 1963, Ser. No. 296,386
7 Claims. (Cl. 260—567.6)

This invention is concerned with a new class of organic salts, their preparation, and a novel intermediate therefor. More particularly, the invention relates to organic salts in which the anion is a cyclononatetraenide ion.

The salts of this invention are embraced by the formula $$M^{\oplus}C_9H_9^{\ominus} \qquad (I)$$

in which $C_9H_9$ is a cyclononatetraenide ion and M is defined as one equivalent of a cation, i.e., one equivalent of a metal, ammonium, sulfonium, arsonium, phosphonium, stibonium, bismuthonium, selenonium, or telluronium cation in which any substituents, other than hydrogen, on the -onium cations are alkyl or aryl of up to 20 carbon atoms. Metals are defined as those elements of atomic number 3, 4, 11–13, 19–32, 37–51, 55–84, 87–102 and above. Preferably the -onium cations may be represented, respectively, as $R_4N^+$, $R_3'S^+$, $R_4'As^+$, $R_4'P^+$, $R_4'Sb^+$, $R_4'Bi^+$, $R_3'Se^+$, and $R_3'Te^+$, where R is hydrogen, alkyl or aryl and can be covalently joined together to form a heterocyclic aromatic ring with the nitrogen (e.g., methylpyridinium, methylquinolinum, dimethylphenanthrolinum, etc.); and R' is alkyl or aryl. Thus, when three R's of $R_4N^+$ are joined together the structure is

where R'' is the carbocyclic portion of a hetero ring system and preferably contains up to a total of 18 carbon atoms. The R and R', described above, can contain up to 20 carbon atoms. Preferably R is hydrogen, lower alkyl or phenyl, and R' is lower alkyl or phenyl.

The formula $M^{\oplus}C_9H_9^{\ominus}$ may also be structurally represented as

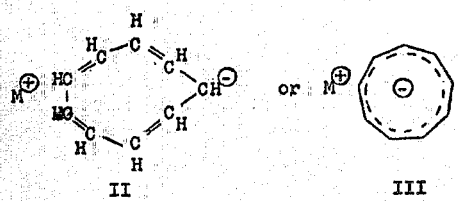

in which M is as defined above.

The hydrocarbon cyclononatetraene has not been described in the chemical literature. The existence of this hydrocarbon has been the subject of speculation by both Alder and Flock [Ber., 87, 1919 (1954)] and King and Stone [J. Am. Chem. Soc., 82, 4557 (1960)] as a valence tautomer of 8,9-dihydroindene.

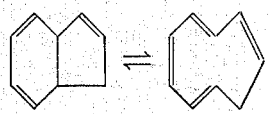

King and Stone also speculate on the possibility of forming metal π-complexes derived from the $C_9H_9$ group formed by loss of hydrogen from the parent hydrocarbon. They synthesized a product from molybdenum hexacarbonyl and 8,9-dihydroindene to which was assigned the structure IV.

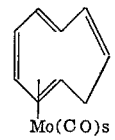

Mo(CO)$_5$ (IV)

However, hydrogen was not lost in the formation of IV.

The compounds of the present invention are salts, rather than neutral complexes of the type IV described by King and Stone. They are formally derived by loss of H+ (proton) from cyclononatetraene to give the cyclononatetraenide anion. Through resonance effects all carbon atoms of the anion, and thus all protons, become equivalent, as shown in Formula III. As also shown in Formula III, the $C_9H_9$ anion must have an associated cation for independent existence.

The salts of this invention are prepared by the reaction of 9-chlorobicyclo[6.1.0]nona-2,4,6-triene with an alkali metal. The 9-chlorobicyclo[6.1.0]nona-2,4,6-triene may be the syn- or anti-isomer, or a mixture of the two. The preparation may be illustrated by the equation

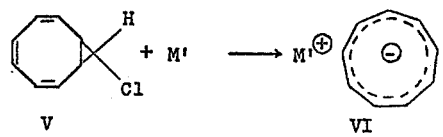

V          VI where M' is an alkali metal, e.g., lithium, sodium, potassium, rubidium, or cesium.

The alkali metal cyclononatetraenides of Formula VI are in turn converted to the other salts of this invention by methathesis as shown in the equation.

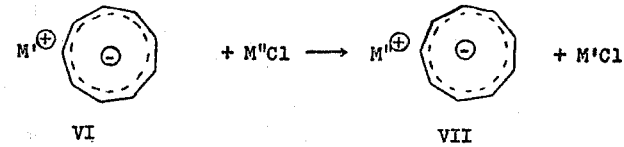

VI          VII in which M'' represents all the embodiments of M as defined above except the alkali metals. Substantially all the compounds of Formula VII are less soluble than those of Formula VI, and are separated out from the reaction mixtures by precipitation.

A preferred group of the cyclononatetraenide salts of this invention are those compounds as defined in Formulas I, II, or III above in which M includes the onium embodiments as defined above, but in which the metal embodiments of M include the metals from Groups I–A, I–B, II–A, II–B, III–A, IV–A, V–A, and VI–A as shown in the Periodic Table appearing in Deming's "General Chemistry," J. Wiley & Sons, fifth edition, 1944, chapter 11. These metals include those of atomic numbers 3, 4, 11–13, 19, 20, 29–32, 37, 38, 47–51, 55, 56, 79–84, 87, and 88.

Cyclononatetraenide salts are sensitive to water and to oxygen. The reactions for their preparation must therefore be conducted in the substantial absence of water and oxygen. It is also desirable to carry out these reactions in a non-oxidizing liquid medium which is inert to the reactants and products. Suitable media include tetrahydrofuran, diethyl ether, ethylene glycol dimethyl ether, diethylene glycol dimethyl ether, hexane, benzene, and the like.

In the dry state and in the absence of oxygen, cyclononatetraenide salts are stable to high temperatures, i.e., to 400° C. and above. However, the starting material 9-chlorobicyclo[6.1.0]nona-2,4,6-triene in solution undergoes rearrangement at temperatures above 65° C. and particularly above 80° C. Accordingly, reactions for the preparation of the alkali metal cyclononatetraenide salts in liquid media are best carried out at temperatures in the range from −80 to +65° C.

Pressure is not a critical factor in the reactions for preparing cyclononatetraenide salts, pressures both above and below atmospheric pressure being operable. Atmospheric pressure is preferred for convenience.

Because of their sensitivity to oxygen, the cyclononatetraenide salts of this invention are useful as oxygen scavengers. For example, a solution of one or more of these salts in a non-oxidizing solvent, such as tetrahydrofuran, acetonitrile, or dimethyl sulfoxide, is useful as a scavenging bath to remove last traces of oxygen from other gases, such as nitrogen, bubbled therethrough.

The n-m-r spectra of the cyclononatetraenide salts show sharp, narrow peaks, and these salts are accordingly useful as standards of reference for comparison and identification of other materials by n-m-r analysis.

The cyclononatetraenide salts show strong absorption of ultraviolet light. Layers of these salts in powder form, laminated between sheets of transparent plastic, provide excellent ultraviolet screens which transmit visible light and screen out ultraviolet light.

The cyclononatetraenide salts are also useful for carrying out trace analyses for water. Solutions of cyclononatetraenide salts show color changes in the presence of water. For example, when a small amount of water is added to a dilute colorless solution of tetraethylammonium cyclononatetraenide in pure acetonitrile, a pink color is observed. In an analogous manner, adding water to a tetrahydrofuran solution of the lithium cyclononatetraenide produces a change from opaque to light yellow in color.

In the following examples parts are by weight unless otherwise indicated. Example II represents a preferred embodiment.

EXAMPLE I

Part A

To a stirred solution of 2000 parts of cyclooctatetraene and 21,990 parts of dry methylene chloride there is added in small portions about 1870 parts of a 5.5% solution of methyllithium in ether. An additional 2000 parts cyclooctatetraene is then added and the portionwise addition of methyllithium solution in ether is continued until a total of 281 parts of methyllithium has been added. The entire addition of methyllithium takes place over a period of 125 minutes. After stirring at room temperature for an additional half hour, 4000 parts of water is added. The product is taken up in ether and washed with water until the washings are no longer basic. After drying over anhydrous $MgSO_4$, the ether is removed in vacuo using an 18″ spinning band column. Unreacted cyclooctatetraene is removed by vacuum distillation using as little heat as possible. Further vacuum distillation yields 393 parts of 9-chlorobicyclo[6.1.0]nona-2,4,6-triene, B.P. 37–39°/0.35 mm. having a syn- to anti-ratio of 3 as determined by n-m-r. The anti-compound has the lower boiling point. The product is stored under nitrogen in a Dry Ice chest. N-m-r [$CDCl_3$ solution, δ in p.p.m. vs. $(CH_3)_4Si$]: multiplet centered at 6.0 (olefinic H), triplet at 3.45 (J=7.6 c.p.s. syn-CHCl), triplet at 2.52 (J=4.3 c.p.s., anti-CHCl) and an unresolved multiplet centered at 1.83 (allylic cyclopropane H).

$\lambda_{max.}^{isooctane}$: 284 mμ (ε 3080); near I.R. in $CCl_4$; 1.67 (ε 0.793) and 1.71μ (ε 1.50); I.R. (neat): 3.30, 3.34, 6.08, 6.18, 7.85, 12.36, 12.65, 12.9, 13.98 and 14.78μ

*Analysis.*—Calcd. for $C_9H_9Cl$: C, 70.82; H, 5.94; M.W., 152.63. Found: C, 70.76; H, 6.14; M.W., 152 (mass spec.)

Part B

The lithium from 125 parts of a 36% dispersion of lithium in wax is separated by three extractions with tetrahydrofuran, the lithium being recovered by filtration. To the remaining lithium is added 1332 parts of tetrahydrofuran and 490 parts of 9-chlorobicyclo[6.1.0]nona-2,4,6-triene. The mixture is stirred for 2¾ hours, during which time it turns brown. Unreacted lithium is separated by filtration to obtain a solution of lithium cyclononatetraenide. The n-m-r spectrum shows a sharp peak at 6.72 p.p.m. to low field from an internal tetramethylsilane reference and integration indicates the yield to be 25%.

EXAMPLE II

In a glass reactor under an argon atmosphere the wax matrix was removed from 313 parts of a 30% lithium dispersion in wax (containing 2% sodium) by extracting three times with 4440-part portions of dry tetrahydrofuran. The tetrahydrofuran wax extract is removed by filtration. One thousand parts of 3:1 syn:anti mixture of 9-chlorobicyclo[6.1.0]nona-2,4,6-triene in 4440 parts of dry tetrahydrofuran is then added. Upon stirring the reaction mixture in an argon atmosphere at room temperature, a mild exothermic reaction occurs within 5–10 minutes and the reaction mixture turns dark. The reaction is complete within two hours to obtain lithium cyclononatetraenide in 63% yield as determined by n-m-r. The salt is obtained as a solution in tetrahydrofuran. $H^1$n-m-r [THF solution, δ in p.p.m. vs. $(CH_3)_4Si$]: 6.72 p.p.m. having a half width no greater than 0.8 c.p.s. $C^{13}$ n-m-r: doublet at 19.0 p.p.m. (J=137 c.p.s.) (14.2 mc./sec., carried out on solution twice as concentrated as that described above, reported in p.p.m. to high field from benzene). The $C^{13}$ chemical shifts and coupling constant are determined by measuring the chart distance between the $C_9$ resonance and the low field triplet of the THF solvent and comparing this value with the observed chart distance between the $C_6H_6$ doublet and the low field THF triplet (δ taken as 61 p.p.m.) as determined at identical instrument settings with a benzene-THF solution.

EXAMPLE III

To a stirred solution of lithium cyclononatetraenide in tetrahydrofuran solution prepared as described in Example II there is added a solution of 1000 parts of anhydrous tetraethylammonium chloride in 14,840 parts of dry chloroform. A white precipitate separates immediately. After stirring for three minutes another 14,840-part portion of chloroform is added, the precipitate filtered under nitrogen and washed with more chloroform to give 1020 parts of crude white tetraethylammonium cyclononatetraenide. The product is purified by recrystallizing under nitrogen two times from anhydrous acetonitrile, MP. 318° (dec.). N-m-r ($d^6$ dimethyl sulfoxide, δ in p.p.m. vs. $(CH_3)_4Si$): 6.82 (aromatic H, half width no greater than 0.6 c.p.s.); quartet at 3.03 ($CH_2$, J=7 c.p.s.), triplet of triplets at 1.05 ($CH_3$, J=7 c.p.s. ca. 1.5 c.p.s.).

$\lambda_{max.}^{(hexachlorobutadiene)}$: 3.32, 3.42, 5.28, 5.58, 6.78, 6.96, 7.22 8.54 and 9.98μ

*Analysis.*—Calcd. for $C_{17}H_{29}N$: C, 82.52; H, 11.81; N, 5.66. Found: C, 82.30; H, 11.55; N, 5.75.

When sodium, potassium, rubidium, or cesium is substituted for lithium in the procedure of Example II, the corresponding sodium, potassium, rubidium, and cesium cyclononatetraenides are obtained.

When the salt intermediates indicated in Table I below are substituted for tetraethylammonium chloride in the procedure of Example III, the indicated cyclononatetraenide salts are obtained.

TABLE I

| Salt Intermediate | Cyclononatetraenide Salt Product |
|---|---|
| $BeCl_2$ | $Be(C_9H_9)_2$ |
| $MgCl_2$ | $Mg(C_9H_9)_2$ |
| $AlCl_3$ | $Al(C_9H_9)_3$ |
| $CaCl_2$ | $Ca(C_9H_9)_2$ |
| $ScCl_3$ | $Sc(C_9H_9)_2$ |
| $TiCl_3$ | $Ti(C_9H_9)_3$ |
| $TiCl_4$ | $Ti(C_9H_9)_4$ |
| $VCl_2$ | $V(C_9H_9)_2$ |
| $VCl_3$ | $V(C_9H_9)_3$ |
| $CrCl_2$ | $Cr(C_9H_9)_2$ |
| $CrCl_3$ | $Cr(C_9H_9)_3$ |
| $MnCl_2$ | $Mn(C_9H_9)_2$ |
| $MnCl_4$ | $Mn(C_9H_9)_4$ |
| $FeCl_2$ | $Fe(C_9H_9)_2$ |
| $FeCl_3$ | $Fe(C_9H_9)_3$ |
| $CoCl_2$ | $Co(C_9H_9)_2$ |
| $CoCl_3$ | $Co(C_9H_9)_3$ |
| $NiCl_2$ | $Ni(C_9H_9)_2$ |
| $CuCl$ | $Cu(C_9H_9)$ |
| $CuCl_2$ | $Cu(C_9H_9)_2$ |
| $ZnCl_2$ | $Zn(C_9H_9)_2$ |
| $GaCl_3$ | $Ga(C_9H_9)_3$ |
| $GeCl_2$ | $Ge(C_9H_9)_2$ |
| $GeCl_4$ | $Ge(C_9H_9)_4$ |
| $(CH_3)_4NCl$ | $(CH_3)_4N(C_9H_9)$ |
| $(CH_3)_3SCl$ | $(CH_3)_3S(C_9H_9)$ |
| $(CH_3)(C_6H_5)_3AsCl$ | $(CH_3)(C_6H_5)_3As(C_9H_9)$ |
| $(CH_3)(C_6H_5)_3PCl$ | $(CH_3)(C_6H_5)_3P(C_9H_9)$ |
| $(CH_3CH_2)(C_6H_4)_3SbCl$ | $(CH_3)(C_6H_5)_3Sb(C_9H_9)$ |
| $(CH_3)(C_6H_5)_3BiCl$ | $(CH_3)(C_6H_5)_3Bi(C_9H_9)$ |
| $(CH_3CH_2)_3SeCl$ | $(CH_3CH_2)_3Se(C_9H_9)$ |
| $(CH_3)_3TeCl$ | $(CH_3)_3Te(C_9H_9)$ |

Cyclononatetraenides and cyclononatetraenes with organic groups substituted on the cyclononatetraene ring are prepared by treating the parent cyclonoatetraenide with an alkyl halide or an acyl halide.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A salt of the formula $$M^{\oplus}C_9H_9^{\ominus}$$

in which $C_9H_9^{\ominus}$ is the cyclononatetraenide ion and M is one equivalent of a cation selected from the class consisting of a metal, ammonium, sulfonium, arsonium, phosphonium, stibonium, bismuthonium, selenonium, and telluronium, any substituents, other than hydrogen, on the -onium cations being members of the class consisting of alkyl of up to 20 carbon atoms and phenyl.

2. A salt of claim 1 in which the -onium cation is $R_4N^+$; the R's, when separate, being members of the class consisting of hydrogen, alkyl, and phenyl, and, when covalently joined together, form a heterocyclic aromatic ring compound selected from the group methylpyridinium, methylquinolinium and dimethylphenanthrolinium.

3. A salt of the formula

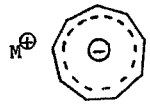

wherein M is one equivalent of a member of the class consisting of a metal, $R_4N^+$, $R_3'S^+$, $R_4'As^+$, $R_4'P^+$, $R_4'Sb^+$, $R_4'Bi^+$, $R_3'Se^+$, and $R_3'Te^+$; in which R is a member of the group consisting of hydrogen, alkyl and phenyl; and R' is a member of the class consisting of alkyl and aryl; said R and R' containing up to 20 carbon atoms.

4. Lithium cyclononatetraenide.

5. Tetraethylammonium cyclononatetraenide.

6. The process for preparing a salt of claim 1 which comprises reacting in the substantial absence of water and oxygen an alkali metal with 9-chlorobicyclo[6.1.0]nona-2,4,6-triene at temperatures in the range from −80 to +65° C.

7. The process of claim 6 in which a nonoxidizing liquid medium inert to reactants and products is employed.

References Cited by the Examiner

UNITED STATES PATENTS

| 2,784,240 | 3/1957 | Cope et al. | 260—648 |
| 2,880,239 | 3/1959 | Semmons et al. | 260—567.6 |
| 2,931,833 | 4/1960 | Matt | 260—567.6 |
| 3,007,974 | 11/1961 | Lippincott | 260—648 |
| 3,085,118 | 4/1963 | Foster | 260—665 |

OTHER REFERENCES

Alder et al.: Ber. Deut. Chem., vol. 87, pp. 1905–1916 (1954).

Borg et al.: Proc. Chem. Soc. (London), vol. of 1958, page 283.

Cope et al.: J.A.C.S., vol. 74, pp. 173–174 (1952).

Horner et al.: Ber. Deut. Chem., vol. 91, pp. 430–437 (1958).

Katz et al.: J. Chem. Phys., vol 32, pp. 1873–1875 (1960).

CHARLES B. PARKER, *Primary Examiner.*

F. D. HIGEL, *Assistant Examiner.*